Patented Mar. 13, 1934

1,951,052

UNITED STATES PATENT OFFICE 1,951,052

REACTION PRODUCTS OF MERCAPTO-ARYL-THIAZOLES AND ORGANIC ACID HALIDES

Marion W. Harman, Nitro, W. Va., assignor to The Rubber Service Laboratories Company, Akron, Ohio, a corporation of Ohio No Drawing. Application July 1, 1931, Serial No. 548,255

7 Claims. (Cl. 260—44)

The present invention relates to the manufacture of a new class of compounds comprising reaction products of a mercapto-aryl-thiazole and an organic acid halide. The new class of compounds possess valuable accelerating properties when employed in the process of vulcanizing rubber.

Compounds of the preferred class may in general be prepared by treating a mercapto-aryl-thiazole or an inorganic or organic salt thereof with an organic acid halide under reaction conditions, with consequent elimination of the corresponding hydrohalogenic acid or salt thereof.

Example 1

More specifically, one of the preferred new class of compounds, for example, a reaction product of mercapto-benzo-thiazole and phthalyl chloride, was prepared as follows: Substantially two molecular proportions of mercapto-benzo-thiazole and substantially two molecular proportions of sodium hydroxide, the latter being dissolved in a very small amount of water, were agitated with a convenient quantity of a suitable solvent, for example, acetone, until solution took place. Substantially one molecular proportion of phthalyl chloride was then added slowly thereto while maintaining a temperature not higher than approximately 10° C. The resulting mixture was preferably agitated for a suitable period, preferably approximately thirty minutes, after all the phthalyl chloride had been added. The reaction product was filtered off and washed with a suitable solvent, for example, acetone, to remove any unreacted mercapto-benzo-thiazole, and further washed with water. The product obtained was a fine, pale yellow powder. It is believed the product so obtained may be represented by the following formula

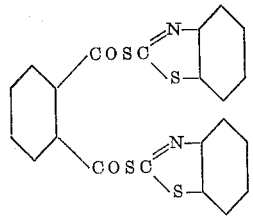

The above described material has also been prepared by the following method: Substantially two molecular proportions of the salt formed by reacting mercapto-benzo-thiazole with diphenyl-guanidine was suspended in a convenient quantity of water and the mixture rapidly agitated. A solution of substantially one molecular proportion of phthalyl chloride in a small quantity of a volatile solvent immiscible in water, for example, carbon tetrachloride, benzol and the like, was added slowly thereto, and after further agitation the product formed was filtered off, washed with water and dried. A finely divided crystalline product was obtained.

The product described above was also prepared by the following method: Substantially one molecular proportion of phthalyl chloride dissolved in a small quantity of a volatile solvent immiscible in water, for example, benzol, was added slowly to a rapidly agitated solution of substantially two molecular proportions of the sodium salt of mercapto-benzo-thiazole in water, maintained within the temperature range of approximately 6 to 25° C., but preferably at approximately 10 to 15° C. It is believed that the volatilization of the solvent immiscible in water, as employed in the above process, aids in producing a very finely divided product. After further agitation an alkaline material, for example, sodium carbonate, was preferably added to dissolve any unreacted mercapto-benzo-thiazole, and, after further agitation, the product formed was filtered off, washed free of alkali, and dried. The product obtained was a fine, pale yellow powder, melting at approximately 127 to 129° C.

A reaction product of mercapto-benzo-thiazole and phthalyl chloride was also prepared by heating substantially two molecular proportions of mercapto-benzo-thiazole and substantially one molecular proportion of phthalyl chloride in the absence of a solvent at approximately 120 to 180° until the reaction was completed.

Example 2

Another example of the preferred class of compounds, for example, a reaction product of mercapto-benzo-thiazole and benzoyl chloride, was prepared by adding a solution of substantially one molecular proportion of benzoyl chloride in a small quantity of a volatile solvent immiscible in water, for example, benzol, slowly to an aqueous solution of substantially one molecular proportion of the sodium salt of mercapto-benzo-thiazole, while rapidly agitating the latter and maintaining at a temperature range of approximately 6 to 25° C., but preferably at approximately 10 to 15° C. After further agitation the product formed was extracted with an alkaline material, for example, sodium carbonate, further washed with water, and dried. It is believed the product so obtained may be represented by the following formula

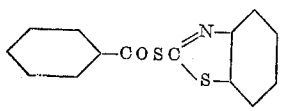

A reaction product of mercapto-benzo-thiazole and benzoyl chloride was also prepared by suspending substantially one molecular proportion of the diphenyl-guanidine salt of mercapto-benzo-thiazole in water, stirring rapidly at approximately 20 to 25° C., and adding slowly thereto substantially one molecular proportion of benzoyl chloride dissolved in a small quantity of a volatile solvent immiscible in water, for example, benzol. The product formed was washed with water, further washed with an alkaline solution, for example, a sodium carbonate solution, and again washed with water.

A reaction product of mercapto-benzo-thiazole and benzoyl chloride was also prepared by refluxing substantially equal molecular proportions of mercapto-benzo-thiazole and benzoyl chloride in a high-boiling solvent, for example, ortho-dichlorbenzene. The product was isolated by removing the solvent employed by any convenient method, as for example, by steam distillation. The residual product obtained was a brown resinous solid.

A reaction product of mercapto-benzo-thiazole and benzoyl chloride was also prepared by heating in the absence of a solvent a mixture of substantially equal molecular proportions of mercapto-benzo-thiazole and benzoyl chloride slowly to approximately 180°, and maintaining at this temperature until reaction was completed.

*Example 3*

Another compound of the preferred class, for example, a reaction product of mercapto-benzo-thiazole and para-nitro-benzoyl chloride, was prepared as follows: Substantially equi-molecular proportions of mercapto-benzo-thiazole and sodium hydroxide were dissolved in a suitable solvent, for example, a mixture of acetone and a small quantity of water. To this solution substantially one molecular proportion of para-nitro-benzoyl chloride dissolved in a small quantity of a suitable solvent, for example, acetone, was added slowly at a temperature of approximately 5 to 10° C. The mixture was stirred for a short time, and the product formed filtered off, washed with a suitable solvent, for example, acetone, to remove any free mercapto-benzo-thiazole, and further washed with water. The reaction product consisted of a yellow powder, melting at approximately 210 to 217° C. It is believed the product so obtained may be represented by the following formula

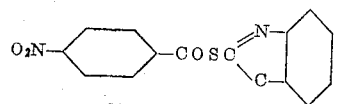

*Example 4*

A further example of the preferred class of compounds was prepared by reacting mercapto-benzo-thiazole with ethyl chloro-sulfonate possessing the formula $C_2H_5OSO_2Cl$. The method was as follows: Substantially one molecular proportion of ethyl chloro-sulfonate was added to substantially one molecular proportion of mercapto-benzo-thiazole in the presence of a suitable liquid medium, for example, chloroform. After standing for a period of time, preferably for several hours, an oil separated. A suitable solvent, for example, naphtha, was then preferably added to the solution to more completely effect the precipitation of the oil. The said oil was drawn off, and could then be washed with a suitable solvent, for example, naphtha. The product thus purified was dried, preferably in vacuo at approximately 80° C. It consisted of a brown oil. It is believed the material prepared as described has the following formula

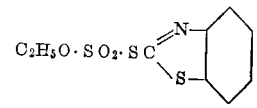

The invention described is not limited to the exact temperatures, proportions and the like hereinbefore set forth but is limited solely by the claims attached hereto as part of this specification.

What is claimed is:

1. A process for the manufacture of a benzo-thiazyl ester, which comprises adding a solution of a carboxylic acid halide of the benzene series in a small quantity of an inert volatile solvent immiscible in water slowly to water containing a salt of mercapto-benzo-thiazole, while agitating the latter.

2. A process for the manufacture of a benzo-thiazyl ester, which comprises adding a solution of benzoyl chloride in a small quantity of an inert volatile solvent immiscible in water slowly to water containing a salt of mercapto-benzo-thiazole, while agitating the latter.

3. A process for the manufacture of a benzo-thiazyl ester, which comprises adding a solution of substantially one molecular proportion of benzoyl chloride in a small quantity of benzol slowly to an aqueous solution of substantially one molecular proportion of the sodium salt of mercapto-benzo-thiazole, while agitating the latter.

4. A process for the manufacture of a benzo-thiazyl ester, which comprises adding a solution of benzoyl chloride in a small quantity of an inert volatile solvent immiscible in water slowly to water containing a salt of mercapto-benzo-thiazole, while agitating and maintaining the latter at a temperature higher than the freezing point of either of the solvents employed but not higher than approximately 25° C.

5. A process for the manufacture of a benzo-thiazyl ester, which comprises adding a solution of substantially one molecular proportion of benzoyl chloride in a small quantity of benzol slowly to an aqueous solution of substantially one molecular proportion of the sodium salt of mercapto-benzo-thiazole, while agitating and maintaining the latter at a temperature between substantially 6° and 25° C.

6. A process for the manufacture of a benzo-thiazyl ester, which comprises adding a solution of substantially one molecular proportion of benzoyl chloride in a small quantity of benzol slowly to an aqueous solution of substantially one molecular proportion of the sodium salt of mercapto-benzo-thiazole, while agitating and maintaining the latter at a temperature of approximately 10 to 15° C.

7. A process for the manufacture of a benzo-thiazyl ester, which comprises adding a solution of a carboxylic acid halide of the benzene series in a small quantity of an inert volatile solvent immiscible in water slowly to water containing a salt of a mercapto-benzo-thiazole, with consequent elimination of the corresponding halide.

MARION W. HARMAN.